United States Patent [19]

Steinberg et al.

[11] 4,309,249
[45] Jan. 5, 1982

[54] NEUTRON SOURCE, LINEAR-ACCELERATOR FUEL ENRICHER AND REGENERATOR AND ASSOCIATED METHODS

[75] Inventors: Meyer Steinberg, Huntington Station; James R. Powell, Shoreham; Hiroshi Takahashi, Setauket; Pierre Grand, Blue Point; Herbert Kouts, Brookhaven, all of N.Y.

[73] Assignee: The United States of America as represented by the United States Department of Energy, Washington, D.C.

[21] Appl. No.: 81,988

[22] Filed: Oct. 4, 1979

[51] Int. Cl.$^3$ ............................ G21C 1/30; G21G 1/00
[52] U.S. Cl. .................................................. 376/192
[58] Field of Search ...................... 176/11, 18, 17, 61, 176/64; 313/61 R, 61 S; 250/398–400, 499–501, 492 B

[56] References Cited

U.S. PATENT DOCUMENTS

| | | | |
|---|---|---|---|
| 2,848,404 | 8/1958 | Treshow | 176/64 |
| 2,929,933 | 3/1960 | Ela, Jr. et al. | 313/61 R |
| 3,180,801 | 4/1965 | Rickert et al. | 176/61 |
| 3,349,001 | 10/1967 | Stanton | 250/499 |
| 3,453,175 | 7/1969 | Hodge | 250/499 |
| 3,500,098 | 3/1970 | Fraser | 176/11 |
| 3,993,910 | 11/1976 | Parkin et al. | 176/11 |
| 4,236,965 | 12/1980 | Lewis | 176/11 |

OTHER PUBLICATIONS

BNL-50592, 11/76, pp. 1–73.
BNL-20518, 9/75, Kukkonen, pp. 149–156.
BAW-1218, Oct.–Dec. 1960, pp. 35–37, FIGS. 18–21.

*Primary Examiner*—Harvey E. Behrend
*Attorney, Agent, or Firm*—Leonard Belkin; Dean E. Carlson; James E. Denny

[57] ABSTRACT

A device for producing fissile material inside of fabricated nuclear elements so that they can be used to produce power in nuclear power reactors. Fuel elements, for example, of a LWR are placed in pressure tubes in a vessel surrounding a liquid lead-bismuth flowing columnar target. A linear-accelerator proton beam enters the side of the vessel and impinges on the dispersed liquid lead-bismuth columns and produces neutrons which radiate through the surrounding pressure tube assembly or blanket containing the nuclear fuel elements. These neutrons are absorbed by the natural fertile uranium-238 elements and are transformed to fissile plutonium-239. The fertile fuel is thus enriched in fissile material to a concentration whereby they can be used in power reactors. After use in the power reactors, dispensed depleted fuel elements can be reinserted into the pressure tubes surrounding the target and the nuclear fuel regenerated for further burning in the power reactor.

40 Claims, 10 Drawing Figures

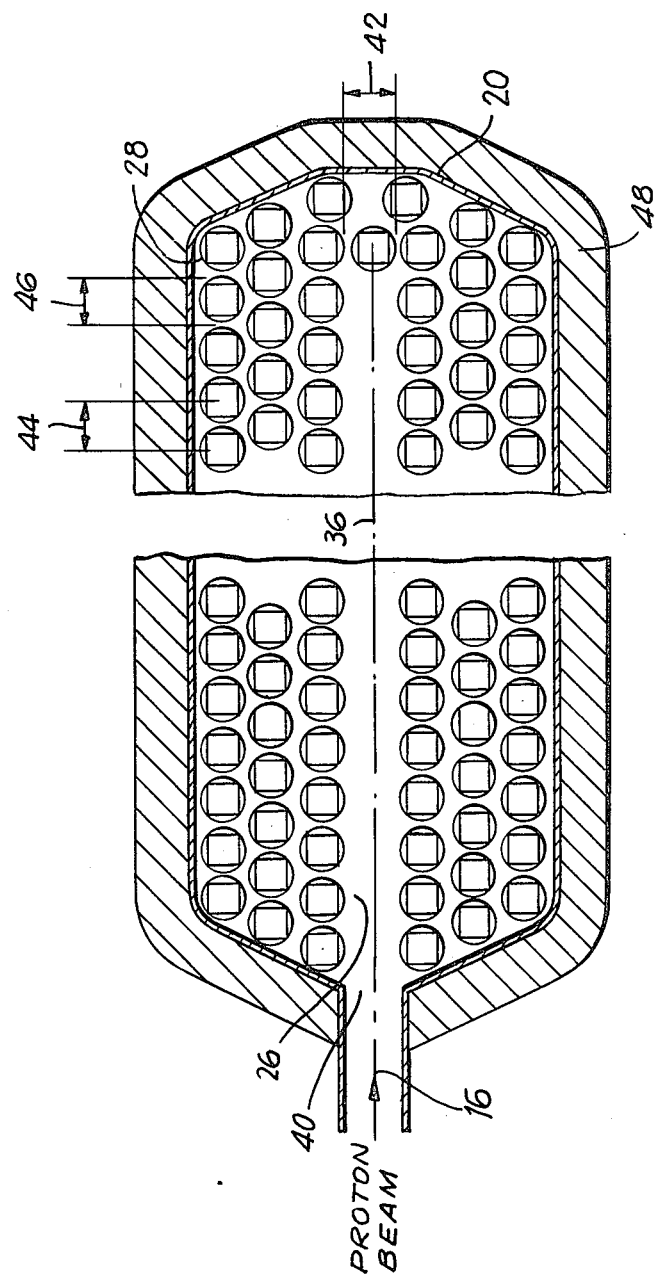

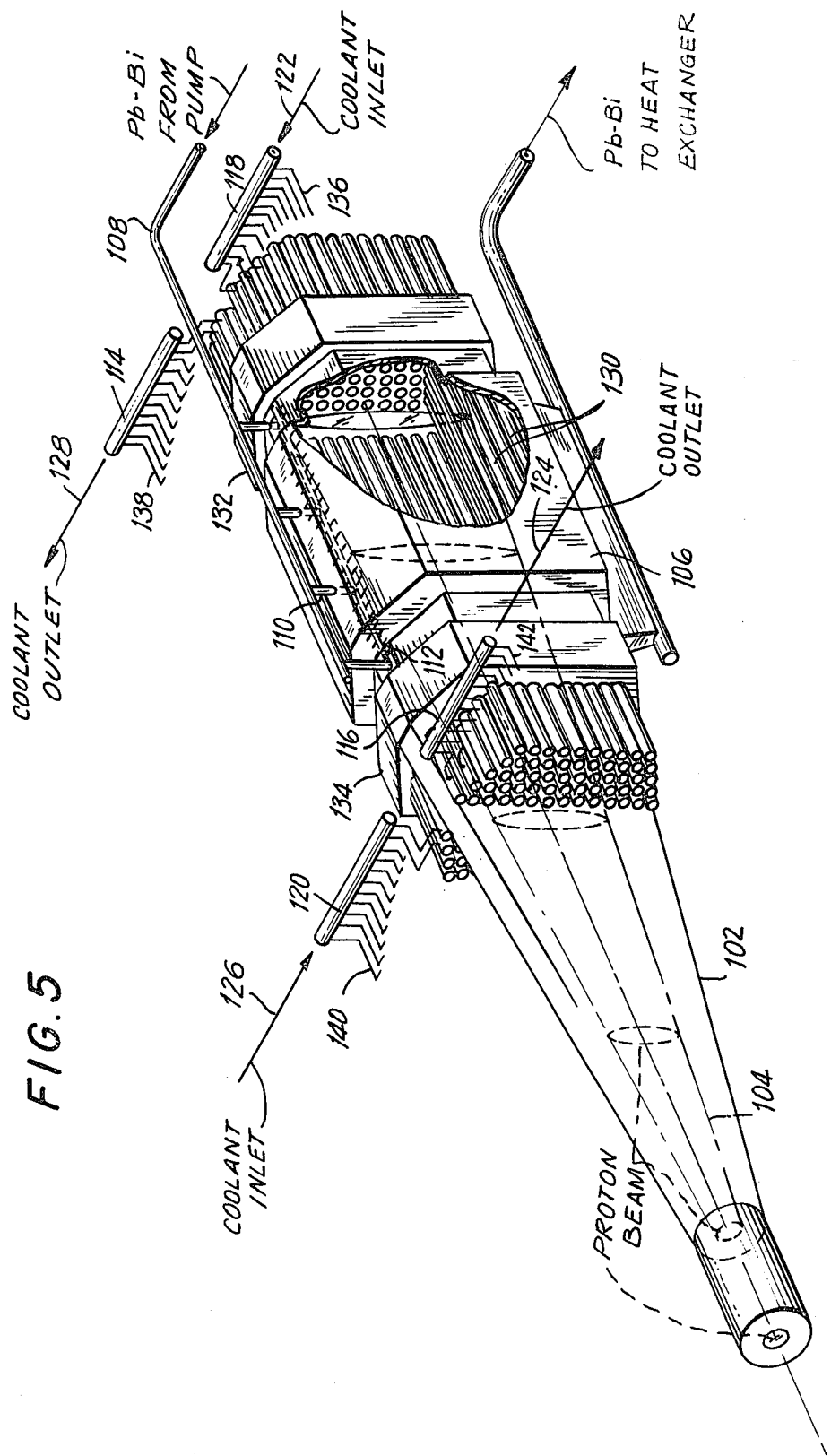

NEUTRON SOURCE, LINEAR-ACCELERATOR FUEL ENRICHER AND REGENERATOR AND ASSOCIATED METHODS

FIELD OF THE INVENTION

This invention relates to neutron sources and to neutron sources employed in apparatus for fuel enrichment and regeneration and to related methods.

BACKGROUND OF INVENTION

This invention was made under, or during the course of, a contract with the U.S. Department of Energy.

The nuclear power industry today is mainly based on light water-cooled thermal burner reactors (LWR's) either of the pressurized water-type (PWR) or the boiling water-type (BWR). These reactors have proven performance in providing reliable and economical power and they actually supply more than ten percent of the electric power generated in the United States today.

The LWR's use low enriched U-235 fuel (LEU). Enrichment is obtained in government-owned gaseous diffusion plants where natural uranium containing seven tenth of a percent of U-235 is enriched to an approximately three percent U-235 content for use in LWR's. The enrichment concentration is chosen for safe, economical operation. It takes about six tons of natural uranium to produce one ton of LEU for use in the LWR power reactors. The depleted five tons of uranium contains about two tenths of a percent of U-235.

The one ton of LEU is fabricated into fuel elements and burned in the LWR at a conversion ratio of approximately six tenths (fissile material produced to fissile material burned) to a total burnup of thirty thousand MWD/ton of the LEU. The burnup limitation is not due to radiation damage to the cladding materials (zircaloy) of the fuel elements.

The spent fuel element upon removal from the LWR contains roughly two percent fissile material, about half of which is Pu-239 and half is the remaining unburned U-235. Assuming no recovery of this fissile material for reuse by reprocessing, the above-described nuclear fuel cycle requires a consumption of 6300 tons of natural uranium for each 1000 MW(e) LWR power reactor over a thirty-year production lifetime for the reactor. This includes initial core inventory. In effect only five tenths of a percent of the natural uranium is utilized to make power and the net burnup amounts to only five thousand MWD/ton of natural uranium. Approximately thirty percent less fuel is required if recovery of the Pu-239 is obtained from the spent fuel element by chemical reprocessing. The requirement would then decrease to about forty-three hundred tons of natural uranium.

The natural uranium resource in the United States has been estimated to be in the order of $3 \times 10^6$ tons. This is for uranium which can be reasonably recovered at a cost of less than one hundred dollars per pound of yellow cake ($U_3O_8$). This resource then can only support a maximum of 480,000 MW(e) of nuclear power. There are other estimates which fix the uranium reserves at only $1.5 \times 10^6$. Therefore, only 240,000 MW(e) of nuclear power would be supportable. There are a number of conservative estimates which indicate that the United States will need somewhere in the neighborhood of 1,000,000 MW(e) of power at the turn of the century and that four hundred reactors (1000 MW(e) each) will share this requirement with other power sources such as coal, oil, and solar. Based on these values, LWR's supplied by the present nuclear fuel cycle cannot be considered as a long-term solution to the energy problem. In fact, utility executives today are quite concerned about whether to invest in another generation of LWR's. The fast breeder reactor (FBR) has thus been put forward as an absolute necessity in insuring the long-term establishment of a nuclear fueled economy.

The fast breeder reactor has a conversion ratio greater than 1.0 so that it allows converting essentially all the naturally occurring U-238 to fissile material for generating power. With the FBR, the uranium resource can ultimately be extended two hundred times the present value and essentially an unlimited energy source then becomes available. However, a number of drawbacks can be listed for FBR's. These include:

1. The fissile material concentration, being ten percent or more in FBR's, is much higher than in LWR's. In fact LWR's must supply the initial Pu inventory for the FBR's.

2. A new technology must be adopted for FBR's to replace the present LWR's. The FBR's are either liquid metal (Na) or gas cooled (He) which implies new and higher unit capital investments and new safety regulations and precautions.

3. Reprocessing of fuel from the FBR is an absolute necessity.

The present domestic policy on nuclear power is to postpone, indefinitely, reprocessing as a means towards impeding the possible proliferation of nuclear weapons. This policy, at once, further limits the nuclear fuel resource for nuclear power generation and tends to eliminate fast breeder reactor fuel cycles. Studies have, therefore, been initiated to investigate alternative nuclear fuel cycles which do not depend on nuclear fuel reprocessing. These studies indicate that without reprocessing, the best burner and convertor fuel cycles can do is stretch the nuclear fuel resource by not more than a factor of two and new HWR technology would have to be introduced. Further stretching in nuclear fuel resources would require safeguarded nuclear fuel reprocessing centers.

Relative to the above and the subject matter of the present invention, there has been found U.S. Pat. No. 3,349,001 which issued to R. M. Stanton on Oct. 24, 1967. This patent discloses a thermal nuclear apparatus having a molten metal proton target surrounded by a blanket of fertile material and a recirculating coolant. The molten metal passes through the assembly providing a changing exposure to accelerated protons for the generation of spallation neutrons.

More particularly, the Stanton patent reveals a target assembly for accelerated nuclear particles. The target comprises a housing with a conduit running symmetrically through and carried by the housing. Molten lead flows through this conduit and a recirculating apparatus is connected to the ends of the conduit for recycling the molten lead. An evacuated tube is longitudinally and symmetrically disposed within the conduit from within the housing to an externally disposed particle accelerator. The tube receives and guides a beam of accelerated nuclear particles emanating from the accelerator. A container is radially disposed around the conduit within the housing and fertile nuclear material is disposed within the container. A coolant passes through and in contact with the fertile material and is carried by the housing. The accelerated particles strike the molten lead which thereby emits nuclear particles which penetrate and react with the surrounding nuclear material causing additional nuclear reactions and generating heat.

As will be seen hereinafter, there are various fundamental differences between the present invention and that disclosed in the Stanton patent whereby the apparatus and methods of the instant invention are substantially more useful and practical. Stanton's approach would lead to excessively high local power densities and fluxes because of rapid beam attenuation.

Other patents which have been located include U.S. Pat. No. 3,993,910 (D. Parkin et al), U.S. Pat. No. 3,623,130 (D. Galrymple), and U.S. Pat. No. 3,500,098 (J. Fraser).

D. Parkin et al entitled their patent "Liquid Lithium Target as a High Intensity, High Energy, Neutron Source." This patent teaches the concept of generating neutrons by spallation of a cascading liquid metal by a high energy neutron beam.

The D. Galrymple patent is entitled "Target Assembly for Thermal Neutron Generator." This patent teaches the concept of utilizing liquid lead-bismuth as a proton beam target for generating neutrons.

J. Fraser entitles his patent "Intense Neutron Generator". This patent discloses a system wherein a molten metal flows past an ion beam.

SUMMARY OF THE INVENTION

It is an object of the invention to provide a source of neutrons suitable for various uses inclusive of fuel enrichment.

Another object of the invention is to provide an apparatus for breeding nuclear fuel within a fabricated fuel element.

Another object of the invention is to provide for fuel enrichment apparatus and techniques as well as improvements in related components and systems.

Still another object of the invention is to provide a target for the beam of a proton accelerator and for use with various types of particle accelerators, the target providing a distribution of spallation neutrons suitable for breeding nuclear fuel.

A further object of the invention is to provide improved flexibility in LWR nuclear fuel cycles.

Yet another object of the invention is to provide for longterm use of LWR thermal reactors economically at competitive cost.

Still another object of the invention is to reduce LWR spent fuel storage.

Still another object of the invention is the exploration of the use of a proton accelerator for radiation waste disposal by transmuting long-lived fission products and transuranics to short-lived and stable products.

In achieving the above and other objects of the invention, there is provided an improved method of generating neutrons by distributing the liquid metal with varying spatial density along a path and guiding a beam of high energy particles along said path through said metal. According to a more particular aspect of the invention, the metal is generated as a plurality of spaced falling (preferably free falling) jets.

According to yet another aspect of the invention, there is contemplated the enriching of fuel elements by arranging the same on opposite sides of the aforesaid path to absorb the neutrons produced by the liquid metal when impinged upon by the said beam. Moreover, as a feature of the invention there is contemplated the recovering of heat which results from the process of enriching of said fuel elements.

According to still another aspect of the invention, there is comprised the recycling of the said fuel elements from and to a nuclear reactor. Still further, it is contemplated that the fuel elements may be enriched before initially being used in said nuclear reactor.

With respect to the apparatus provided in accordance with the invention, a source for supplying a beam of particles is provided, the beam being directed through a predetermined region. A plurality of jets of liquid metal also pass through the region in a direction substantially traverse of the neutron beam. The jets comprise a metal chosen so that it responds to the beam by isotopically emitting a plurality of spallation neutrons for each particle striking the jets and the jets are distributed through the region so that the absorbtion of energy from the beam and the emission of spallation neutrons is substantially uniform through the region.

In the aforesaid, said particle source may be a source of high energy protons. Said means may include a source of liquid lead which constitutes the aforesaid liquid. This lead may be molten lead or the lead may, for example, be part of a lead-bismuth eutectic.

The apparatus of the invention, moreover, will generally comprise a fertile blanket operatively associated with said liquid for the enhancing of said blanket. Said means particularly includes a source of falling liquid metal jets spaced along and in intersecting relation with the aforesaid beam. The blanket will straddle said jets on opposite sides of the beam and means will be provided to collect the falling jets and to recycle the thusly collected liquid metal.

The blanket in accordance with different embodiments of the invention may include vertically aligned tubular fuel assemblies or horizontally aligned tubular fuel assemblies. The blanket will, furthermore, preferably comprise pressure tubes.

According to a more specific aspect of the invention, a vessel is provided enclosing said blanket, a shroud being furthermore provided which opens into said vessel and is adapted for guiding said beam from said source of protons to said vessel and at said jets. Said blanket will advantageously include pressure tubes as aforesaid on opposite sides of said jets, said vessel and shroud cooperatively defining a continuous chamber whereby the need for a window is avoided especially since the liquid metal can be supplied at a relatively low vapor pressure approximating a vacuum or near vacuum.

Within said chamber, said pressure tubes will define isolated chambers and fuel element rods will be provided in said pressure tubes. These fuel element rods may be loaded into and taken out of the pressure tubes by means of special provisions made therefor.

With respect to the particle source, this is preferably as noted hereinabove, a proton accelerator. This proton accelerator will preferably be adapted to generate a beam of the order of magnitude of 1 GeV and 300 ma.

The pressure tubes, which have been mentioned hereinabove, will, preferably define, in the continuous chamber, a slot aligned with the aforesaid shroud and through which said jets pass from said source of falling liquid metal jets. The source of falling liquid metal jets preferably supplies the liquid metal at a vapor pressure of about $10^{-4}$ torr and that a temperature of about 300° C. Means will be provided at the bottom of the aforesaid vessel and slot to collect and remove the liquid metal. The slot will preferably have a width of about 36 cm. A neutron reflector will be provided to cover the aforesaid vessel and the pressure tubes will preferably be made of zircaloy.

In further accordance with the invention, means will be provided to supply a water-steam mixture to the pressure tubes. The vessel will include an upper wall through which said pressure tubes open, a lower wall, and an intermediate wall through which said pressure tubes open, the apparatus further comprising removable plugs in said pressure tubes adjacent the upper wall to permit the selective opening of the pressure tubes for the loading and unloading of the fuel rods. Pipes are provided, as will be shown, extending through the lower wall into the pressure tubes and calandria tubes are provided on the pipes within the pressure tubes. There is furthermore employed means for supplying a water-steam mixture between the lower and intermediate walls to enter into said pressure tubes, said mixture passing into said calandria tubes and out through said pipes.

In further accordance with the invention, means are provided in said calandria tubes to support the fuel element rod therein. Moreover, said means and rods preferably constitute PWR fuel assemblies in each of said calandria tubes and define therein a passage for said water-steam mixture.

In the embodiment of the invention wherein the pressure tubes are horizontally aligned, end shields are provided supporting the pressure tubes adjacent the ends thereof. The end shields may each include a casing provided with openings for the passage of said pressure tubes. A multitude of balls are provided in each said casing through which the pressure tubes are inserted. Means will be provided to supply a water-steam mixture through the pressure tubes.

It will be noted in the following description that a set of falling liquid metal jets are used as the primary target rather than the injecting of liquid metal along the flow axis of a liquid metal carrying pipe as in the aforesaid Stanton patent. This improvement is introduced to avoid leading to excessively high local power densities and fluxes because of rapid beam attenuation. In the concept of the present invention, the spatial density of the liquid metal jets is arranged so that the blanket sees an essentially uniform neutron source which can be designed to give power densities that are acceptable from a cooling standpoint. The variable spatial density, multiple jet target which has not been heretofore employed and which is to be described hereinafter constitutes a practical way to make a spallation neutron source for fissile fuel enrichment as well as for other uses.

In addition, the geometrical arrangements of the blanket and target, to be later described, are unique and are intended to accept presently engineered fabricated LWR fuel elements for fissile enrichment and/or rejuvenation. Furthermore, the invention provides apparatus which avoids the need for the reprocessing of the blanket material to recover the bred fissile material before it can be used in a nuclear reactor.

The above and other objects, features and advantages of the invention will be found in the detailed description which follows hereinafter as illustrated in the accompanying drawing.

BRIEF DESCRIPTION OF THE DRAWING

In the drawing:

FIG. 2 is a horizontal cross-section in diagrammatic form illustrating the geometric arrangement of fuel elements and jets in accordance with the invention, the view corresponding to a horizontal cross-section through FIG. 1;

FIG. 5 is a view corresponding to FIG. 1 of a second embodiment of the invention employing horizontally rather than vertically disposed pressure tubes;

DETAILED DESCRIPTION

A linear accelerator fuel generator is proposed to enrich naturally occurring fertile U-238 or thorium 232 with fissile Pu-239 or U-233 for light-water-reactor use in power reactors. High energy proton beams, for example, in the range of 1 to 3 GeV energy are made to impinge on a centrally-located dispersed liquid target producing spallation neutrons which are then absorbed by a surrounding assembly of fabricated LWR fuel elements.

The criteria for the design of a suitable target assembly is as follows:

1. The proton beam should be in the range of 1 to 3 GeV, because of (a) sufficient proton penetration in a heavy metal target, (i.e., in solid lead, 1 GeV protons have a range of only 60 cm.) and (b) the yield of neutrons per proton increases linearly with proton beam energy, (i.e., it is about 35 neutron/proton in Pb at 1 GeV (so that for a given production rate of neutrons converted to fissile fuel, i.e., in the order of 1 ton/year, the current should be in the order of 300 ma.

2. Since the beam must operate in a vacuum and the target assembly must be cooled under pressure, it is preferable not to have to maintain a thin window through which the beam must penetrate from the vacuum to the higher pressure.

3. Since considerable heat will be developed in the target assembly, it must be safely and economically cooled. The heat recovered should preferably be of a high enough quality to convert to power.

4. The radiation damage to the fertile fuel material must be minimized through proper selection of cladding material.

Figure 1:
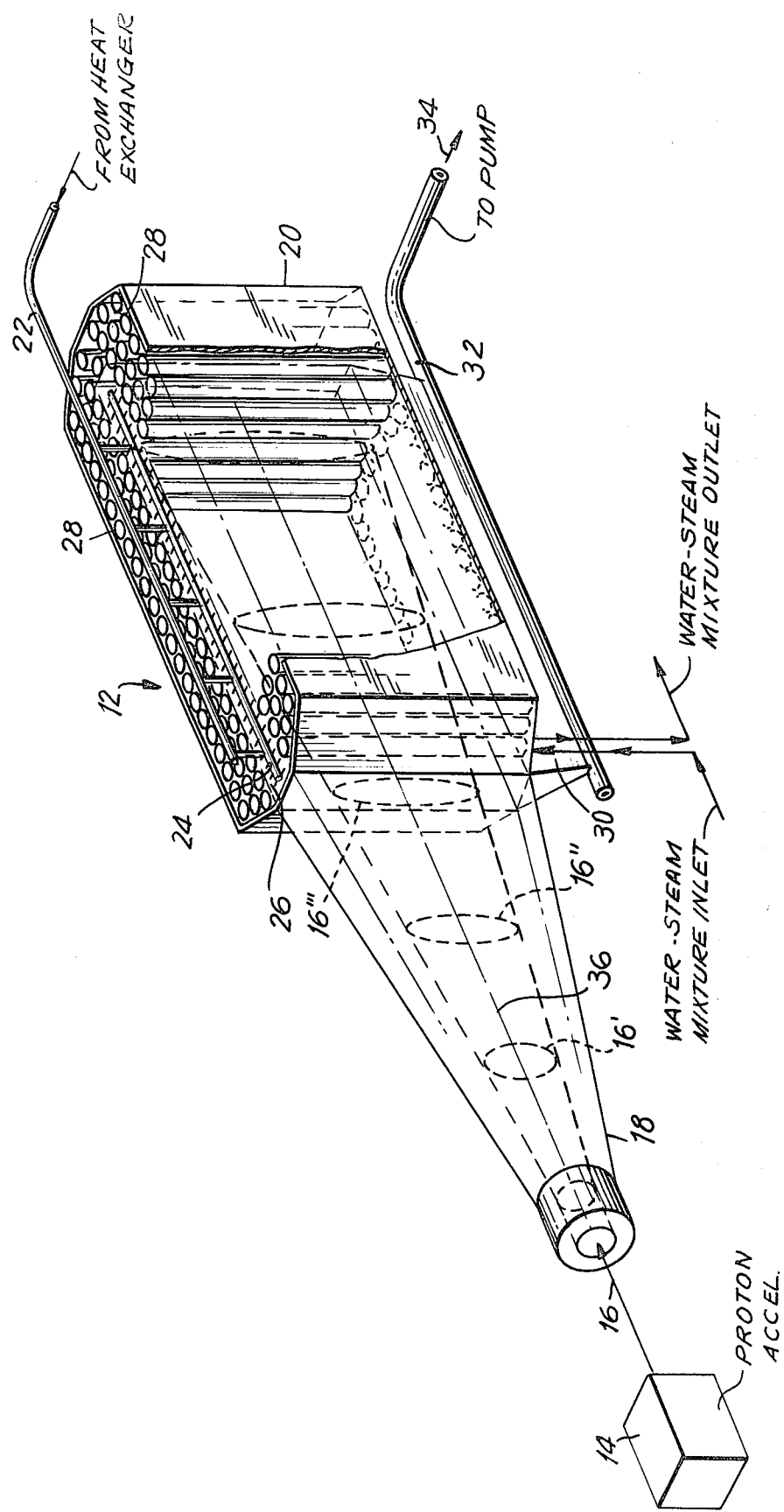
FIG. 1 is a perspective, partly diagrammatic view of a PWR target assembly provided in accordance with a preferred embodiment of the invention.

The target design assembly shown in FIG. 1 constitutes a preferred embodiment of the invention. The assembly is designed to generate fuel in a PWR-type fuel assembly bundle. The bundles are placed in pressure tubes which surround a central slot through which jets of liquid Pb-Bi metal are passed down along the length of a calandria assembly of pressure tubes. A 1 GeV-300 ma proton beam spreads from the beam transport tubes entering the side of the calandria vessel with no interfering walls and interacts with the jets or columns of falling liquid lead. Neutrons are spalled and evaporated isotropically from the lead by the high energy protons and the high energy spallation and evaporation neutrons enter through the walls of the pressure tubes and are absorbed by the PWR-type fuel element rods forming fissile Pu-239 from U-238 in situ. The purpose of the jets is to provide varying spatial density and to disperse the dense Pb-Bi target so as to allow a longer penetration path in the target for the purpose of distributing the neutron flux to a level which will be tolerable from a power density point of view. The Pb-Bi has a vapor pressure of $10^{-4}$ torr at the expected temperature of 300° C., thus maintaining an adequate low vacuum condition for the proton beam. The Pb-Bi is collected at the bottom of the vessel and cooled in a separate circuit.

As more particularly shown in FIG. 1, there is provided, in accordance with the invention, a target assembly generally indicated at 12. Associated therewith is a proton accelerator 14 providing a beam of high energy protons indicated at 16. This beam passes into a proton beam shroud 18 connected to the calandria vessel 20 which will be described in greater detail hereinafter.

The expanded beam from the proton accelerator is further indicated at 16', 16" and 16''', the beam passing into the chamber defined within the vessel 20 without having to pass through a window according to the preferred embodiment. Thus, the shroud 18 and the vessel 20 cooperatively define a single continuous chamber.

Above the vessel 20 is indicated an input header 22 by means of which a liquid metal such as Pb-Bi is supplied to jet spray nozzles 24. The jet spray nozzles supply a plurality of spaced jets which are aligned along the slot 26 formed between pluralities of pressure tubes 28 which constitute a blanket for the falling jets of liquid metal and straddle the same or, which in other words, are located on opposite sides of the jets.

Below the vessel 20 is provided a collecting trough 30, the function of which is to collect the falling jets which are pumped out of the trough via a pipe 32 and pass through a pump utilized for recirculation as indicated by arrow 34. The jets are aligned along the path 36 which is indicated for the beam of protons.

A plan view of the arrangement is shown in FIG. 2, indicating the vacuum vessel boundary and the pressure tube with the internal PWR fuel assemblies. In order to prevent loss of neutrons, the outside area of the calandria vessel is covered with a neutron reflector (i.e., graphite) including top and bottom sections. The assembly should be long enough to accomodate a full length PWR bundle (8 ft. long).

In FIG. 2, it will be more particularly seen that the jets of liquid metal are aligned along the path 36. Also, it will be seen that the pressure tubes 28 are aligned in three rows on opposite sides of the path 36 which passes through the previously mentioned slot 26. It will also be noted that the beam passes into the internal chamber of the vessel 10 via an opening 40 at which there is no window required due to the low vapor pressure involved.

The width of the slot is generally indicated at 42. This width is about 36 cm. The triangular pitch of the pressure tubes is indicated at 44. This is, without limitation, about 36 cm. At the same time, the I.D. of the pressure tubes is seen indicated at 46. This is preferably about 30.7 cm.

As has been noted hereinabove, in order to prevent the loss of neutrons, the outside area of the calandria vessel is covered with a neutron reflector. This is indicated in FIG. 2 at 48. The neutron reflector, as has been mentioned above, may be, for example, of graphite. It may be of top and bottom sections which may, but need not necessarily, be detachable in order to facilitate maintenance and repair and in order to provide appropriate access to the pressure tubes, as will be further discussed hereinafter. If the sections are not detachable, suitable openings or doors will be provided to permit whatever access is required.

Reference has been made above to the varying spatial density of the liquid metal and the advantageous results obtained therefrom. The varying spatial density is achieved by using spaced jets. Preferably, the jets are solid in the sense that they do not consist of spray drops. They moreover have a liquid to space ratio along the proton path such that the liquid metal occupies 10-50% and preferably about 20% of the distance through which the accelerated particles travel in intersecting the jet arrangement. If the jets do, however, consist of spray drops, the ratio should be the same.

The jets, moreover, will preferably be arranged on centers spaced by about two to three times their average diameters. An acceptable average diameter is about 2 cms. Thus, the centers will be spaced by about 4-6 cms.

In a preferred example, the jets and associated spacing may extend along a distance of about 3 meters. In such case, the jets will preferably occupy an aggregate spacing of about 50-60 cms. The fluid metal will preferably initially fall at a speed of about 5-10 ft./sec. Its temperature will preferably not exceed 500° C. with a preferred inlet temperature of 400° C. The melting point temperature for the lead-bismuth eutetic is 185° C. and for lead is 330° C. A high surface tension liquid metal is preferred to prevent the jets from breaking up into drops.

While the jets may preferably be arranged along a rectilinear path, the jets may also be offset relative to each other to form a triangular grid or lattice. The jets may be of wedge shape rather than circular and may be of different diameters. The important thing is to have a liquid metal to space ratio of the magnitude set forth above.

Figure 3:
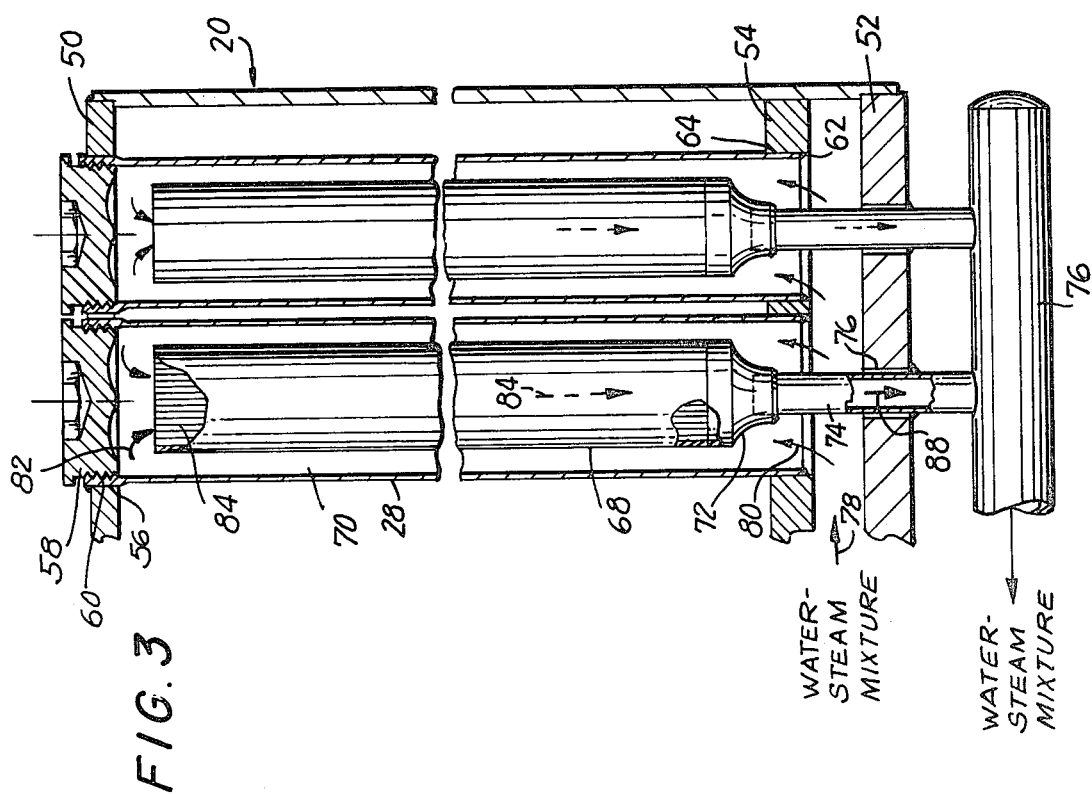
FIG. 3 is a view of a detail of the apparatus of FIGS. 1 and 2, illustrating the arrangement of pressure tubes and calandria tubes to provide for the recovery of heat generated upon the absorption of neutrons by the fuel elements.

For cooling purposes, because it is necessary to provide a hard spectrum, steam is used, but since a high heat flux is also expected, wet steam or two-phase evaporative cooling is used. The calandria tubes are made of zircaloy as is the cladding of the PWR elements. Wet steam prevents corrosion of the zircaloy. FIG. 3 shows a typical PWR-type pressure tube assembly and cooling circuit. Since top loading of fuel elements is required, a shroud tube and channel surrounding each element is provided for counterflow of the steam-water coolant. The steam pressure should operate at about 2000 psi and outlet temperature no higher than about 600° F.

In FIG. 3 is more particularly indicated the vessel 20. Herein, it is seen that the vessel 20 has an upper sheet or wall 50, a lower sheet or wall 52 and an intermediate sheet or wall 54. The pressure tubes 28 extend between the upper wall 50 and the intermediate wall 54. The tubes extend through the upper wall as, for example, indicated at 56. Each tube would be upwardly open except for the provision of a removable plug such as indicated at 58. The removable plugs and upper ends of the pressure tubes 28 are threaded as indicated at 60 to provide ease of insertion and detachment.

The pressure tubes 28 open downwardly through holes 62 provided in the intermediate wall to which the pressure tubes are connected such as indicated at 64. Inside of the pressure tubes are provided calandria tubes 68. These define, with the pressure tubes 28, a channel 70. The calandria tubes taper downwardly by an adapter shown at 72 and are welded onto or otherwise connected to pipes such as indicated at 74. These pipes pass downwardly through holes 76 in the lower wall 52 and are connected to an output header 76, the purpose of which is soon to be indicated.

A source of water-steam mixture is diagrammatically indicated at 78. This mixture passes between the lower wall 52 and intermediate wall 54 and enters as indicated by arrows 80 into channels 70. It passes upwardly through the pressure tubes 28 until arriving at the tops thereof, whereat the direction of the mixture reverses as indicated by arrows 82. The mixture passes downwardly through the calandria tubes 68 passing by the fuel elements indicated at 84 in heat exchange relationship therewith. The steam continues outwardly as indicated by arrows 84 and 88 through pipes 74 into output header 76 whereat the water-steam mixture is removed.

Figure 4:
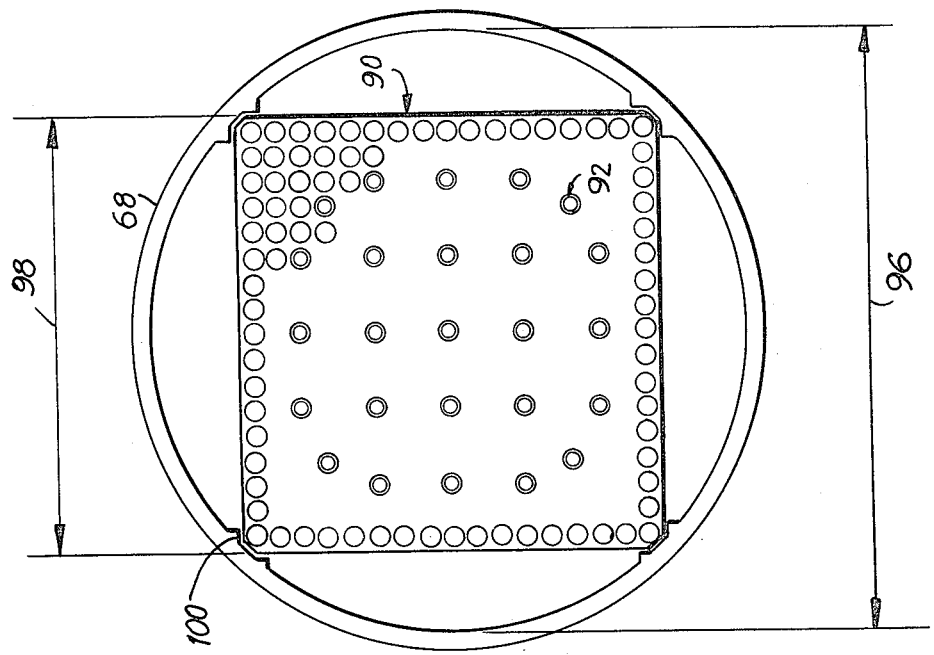
FIG. 4 is a horizontal cross-section through a fuel assembly as employed in the apparatus of FIGS. 1-3.

A cross-section of the fuel assembly within the shroud tube or calandria tube 68 is shown in FIG. 4. Therein, within the calandria tube 68, appears a PWR fuel assembly 90. The fuel assembly 90 comprises a plurality of guide thimbles 92 which accomodate the PWR control cluster element. The fuel elements are indicated at 94. There are, in a presently engineered assembly, two hundred and sixty-four of such elements and they have an outside diameter of 0.374 inches.

The inside diameter of the calandria tube 68 is indicated at 96 and the lateral dimension of PWR fuel assembly is indicated at 98. The inside diameter of the calandria tube may, for example, be in the order of 12.0 inches and the lateral dimension 98 of the assembly may be, for example, 8.426 inches. The assembly is square in cross-section and the corners thereof are accomodated in a receptacle 100 of which four are provided on the inside of the tube 68.

In the aforegoing arrangement of FIGS. 1-4, the beam is intended to pass into the jets by travelling through a vacuum. In order that this vacuum be substantially preserved, the source of falling liquid metal jets supplies the liquid metal at a vapor pressure of about $10^{-4}$ torr and at a temperature of about 300° C. To minimize deterioration of the pressure tubes, these are presently formed of zircaloy.

Figure 6:
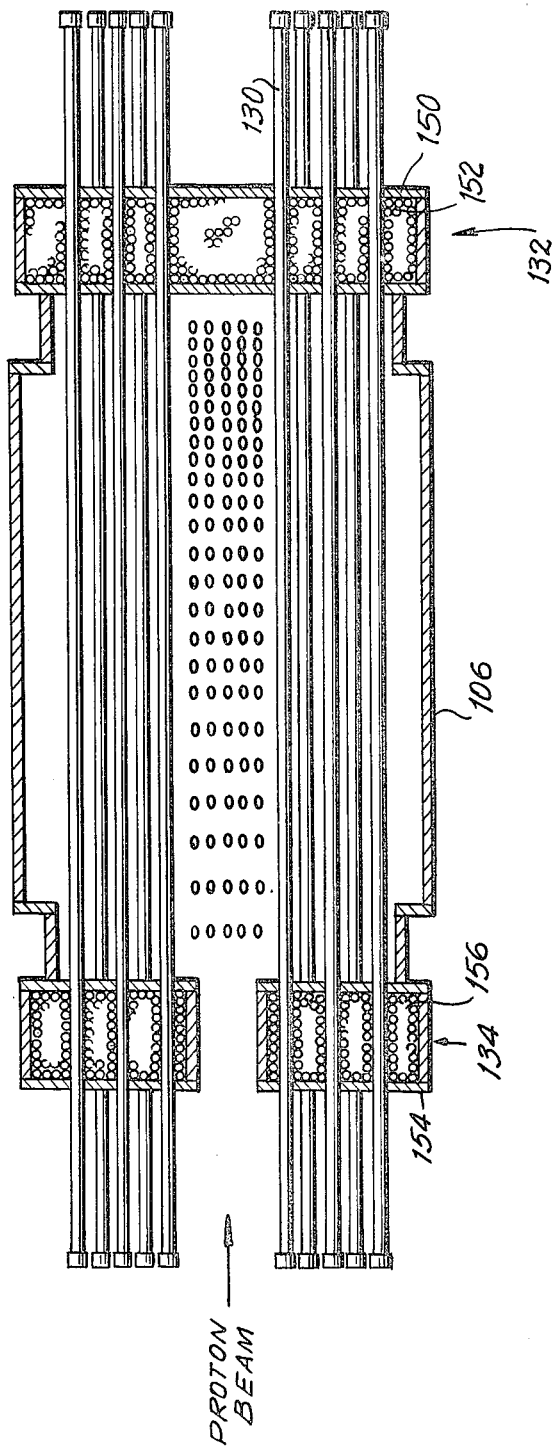
FIG. 6 is a diagrammatic view corresponding to a horizontal section through the pressure tube arrangement of FIG. 5.

Another target assembly arrangement is shown in FIG. 5. This assembly is a horizontal pressure tube-type assembly similar in concept to known CANDU reactors. However, in accordance with the invention, Pb-Bi jets are provided in a center slot with pressure tubes surrounding the same. The fuel elements are inserted horizontally through the pressure tubes. Shorter elements can be used in this arrangement. A plan cross section of the HWR-type design is shown in FIG. 6. The advantage of this design is that there is no reentry or shroud tube needed and the flow of coolant is straight through from one end to the other. A penalty is that a tube sheet seal through reflector and shielding end tube sheets must be provided so that the tubes have the capability of expanding and contracting due to heating and cooling during startup and shutdown while maintaining vacuum.

In FIG. 5 is more particularly indicated a shroud 102 for the guiding of the proton beam 104. The cooperating vessel is diagrammatically indicated at 106 and an input conduit 108 is indicated for liquid Pb-Bi. Leading from the conduit 108 are shown a plurality of depending pipes 110 going to nozzles 112. Coolant outlets are indicated at 114 and 116 whereas coolant inlets are indicated at 118 and 120. The flow of coolant is diagramatically illustrated by arrows 122, 124, 126 and 128.

In this embodiment of the invention, as noted above, horizontal pressure tubes are employed. These are indicated generally at 130. To support these pressure tubes, there are provided end shields 132 and 134. Connections are made directly between the pipes 114, 116, 118, and 120 with the ends of the horizontal pressure tubes 130 by pipes indicated at 136, 138, 140 and 142.

FIG. 6 indicates end shields 132 and 134 along with calandria vessel 106 and horizontal pressure tubes 130. In this figure, it is seen that end shield 132 consists of a casing 150 provided with openings for the passage of the pressure tubes and within this casing are provided a multitude of steel balls 152 which provide for the insertion of the pressure tubes and the engaging by the end support of the same. Similarly, end shield 134 is provided with a casing 154 in which are provided a multiple of steel balls 156 which perform a similar function. Aside from as mentioned hereinabove, however, the embodiment of FIGS. 5 and 6 operate generally as the embodiment described hereinabove with respect to FIGS. 1-4.

Neutronic transport calculations were used to determine neutron yield, flux, burnup, and fissile fuel production relative to the use of the apparatus described hereinabove. From Monte Carlo calculations for neutrons yield per GeV proton impinging on Pb and $UO_2$ targets (see Table I), it can be seen that, for an infinite target and neglecting high energy fission in $UO_2$, the spallation and evaporation yields of neutrons per 1 GeV proton are about the same as a statistical average of about 35 neutrons per proton.

TABLE I

MONTE CARLO CALCULATIONS FOR Pb AND $UO_2$
NEUTRONS PRODUCED BY REACTIONS OF GREATER THAN OR EQUAL TO 15 MeV EXCITATION ENERGY
NEUTRONS/1 GeV PROTON

| BATCH | Pb | $UO_2$ |
| --- | --- | --- |
| 1 | 37.84 | 35.24 |
| 2 | 34.32 | 32.04 |
| 3 | 36.16 | 34.08 |
| 4 | 33.60 | 38.80 |
| 5 | 37.96 | 36.12 |
| 6 | 30.36 | 37.52 |
| 7 | 30.44 | 34.84 |
| 8 | 38.76 | 38.68 |
| 9 | 34.00 | 29.80 |
| 10 | 38.48 | 33.68 |
| Average Y = | 35.192 | 35.080* |

Infinite medium, 1 GeV proton injected into center lowest energy 15 MeV.
*Does not include fission neutrons < 15 MeV.

By inserting the water for cooling the target, the neutron yield is lowered somewhat. The values of neutron yields for various volume ratio of moderator water to $UO_2$ fuel and water density are given below in Table II:

TABLE II

MONTE CARLO CALCULATIONS FOR WATER/$UO_2$ SYSTEM NEUTRONS PRODUCED BY REACTIONS GREATER THAN OR EQUAL TO 15 MeV EXCITATION ENERGY NEUTRONS/1 GeV PROTON
($V_{H_2O}/V_{UO_2}$): ($\rho H_2O$)

| BATCH # | (2);(0.7) | (1);(0.7) | (.5);(0.7) | (.5);(0.35) | (.5); (0.175) |
|---|---|---|---|---|---|
| 1 | 28.00 | 31.80 | 31.84 | 29.92 | 36.24 |
| 2 | 21.84 | 27.68 | 23.60 | 33.52 | 35.96 |
| 3 | 34.44 | 28.92 | 28.48 | 27.40 | 29.84 |
| 4 | 29.04 | 30.40 | 21.52 | 27.64 | 28.76 |
| 5 | 29.16 | 25.84 | 33.48 | 31.16 | 30.56 |
| 6 | 21.24 | 29.64 | 26.84 | 38.72 | 26.64 |
| 7 | 31.04 | 24.76 | 30.80 | 28.28 | 30.72 |
| 8 | 24.64 | 27.76 | 28.16 | 36.24 | 30.00 |
| 9 | 30.52 | 28.80 | 27.16 | 27.48 | 34.28 |
| 10 | 26.40 | 36.16 | 32.32 | 27.24 | 26.32 |
| AVG. Y = | 27.632 | 29.176 | 28.420 | 29.760 | 30.932 |

Natural Uranium-Water
Infinite Medium
1 GeV Proton injected into center

Figure 7:
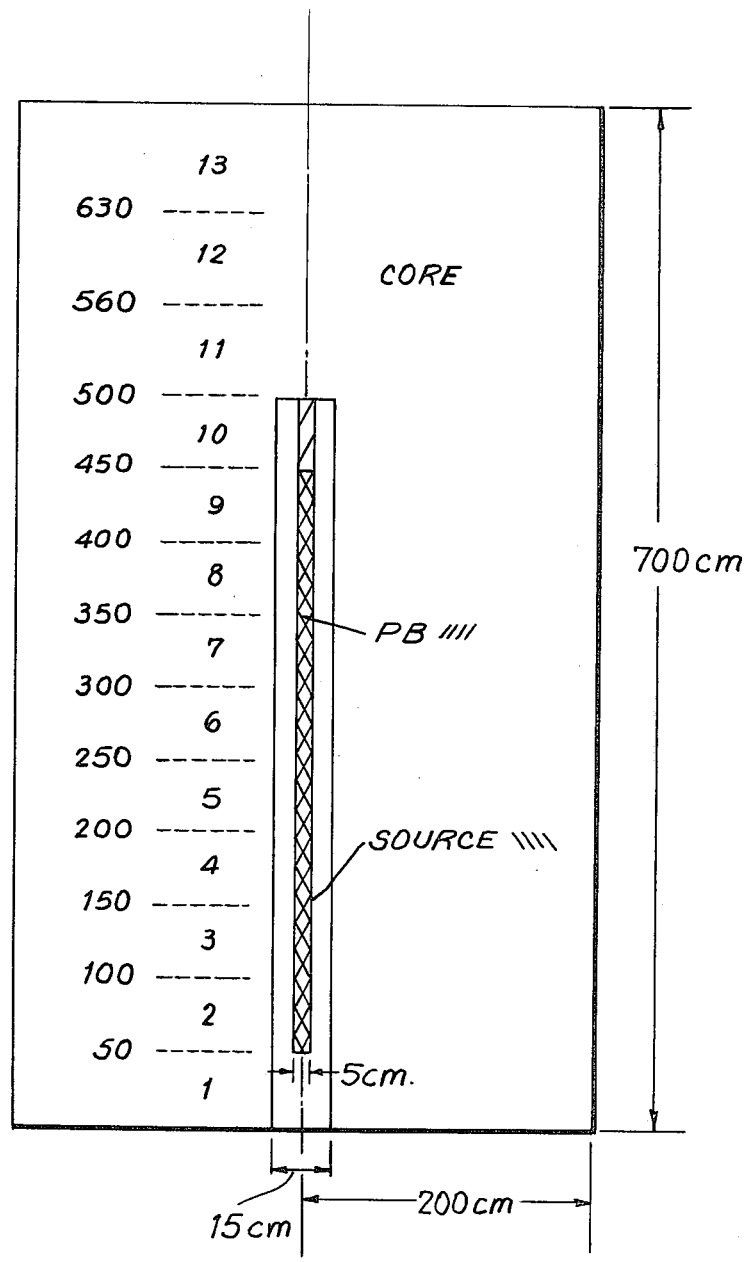
FIG. 7 is a diagram illustrating the general geometry for flux distribution calculation.

The statistical average goes from 27.6 neutron per GeV proton for pressurized water-type configuration (volume ratio $H_2O/UO_2=2$ and $\rho H_2O=0.7$) to 30.9 for steam cooled tight packed assembly (volume ratio $H_2O/UO_2=0.5$ and $\rho H_2O=0.175$), which is not a large drop from the infinite metal medium calculations given in the previous figure. The general geometry is shown in FIG. 7 for flux distribution calculations. The calculation of initial yield (no fissile material in fuel) is given in Table III for various neutron yields (including fast fission reactions), fertile material (Th or U cycle) and coolant-type ($H_2O$ or $D_2O$) and density.

Figure 8:
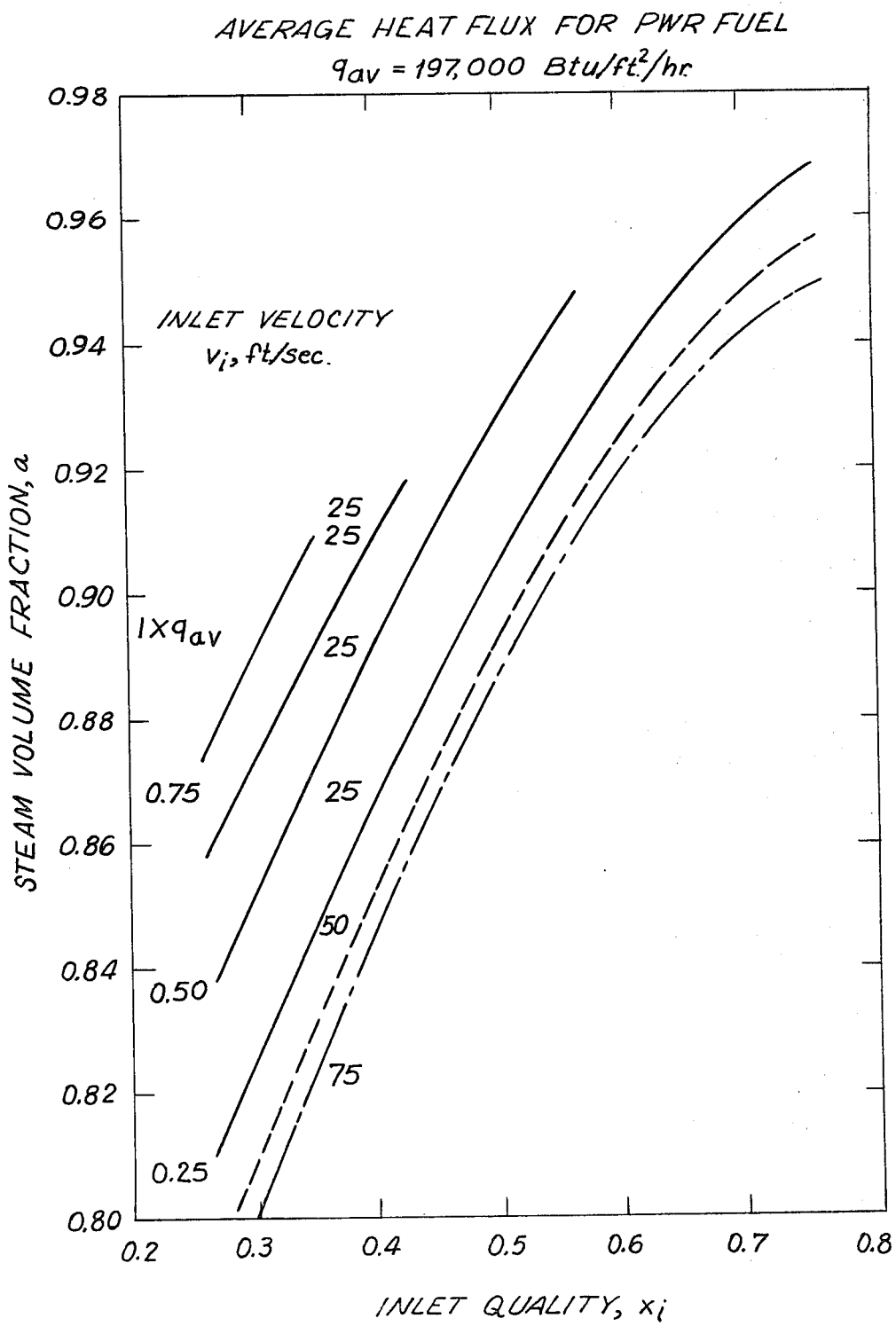
FIG. 8 is a chart illustrating the heat transfer characteristics of an assembly of the invention.

A parametric study was made of the thermal hydraulics of the system. The heat transfer characteristics of the assembly for the two phase coolant (steam-water) is shown in FIG. 8. The average heat flux of 197,000 BTU/ft$^2$/hr is equivalent to about 0.62 MW/m$^2$. For various steam inlet qualities ranging from 30% steam in water to 70% steam in water, the average steam concentration ranges from 80% steam to 92% steam for coolant velocities ranging from 25 to 75 ft/sec (and for various fractions of the heat flux), which is reasonable for evaporative cooling purposes while avoiding drying out the steam mixture. Wet steam is required to prevent the corrosion of the zircaloy metal cladding on the elements and the pressure tubes.

Figure 9:
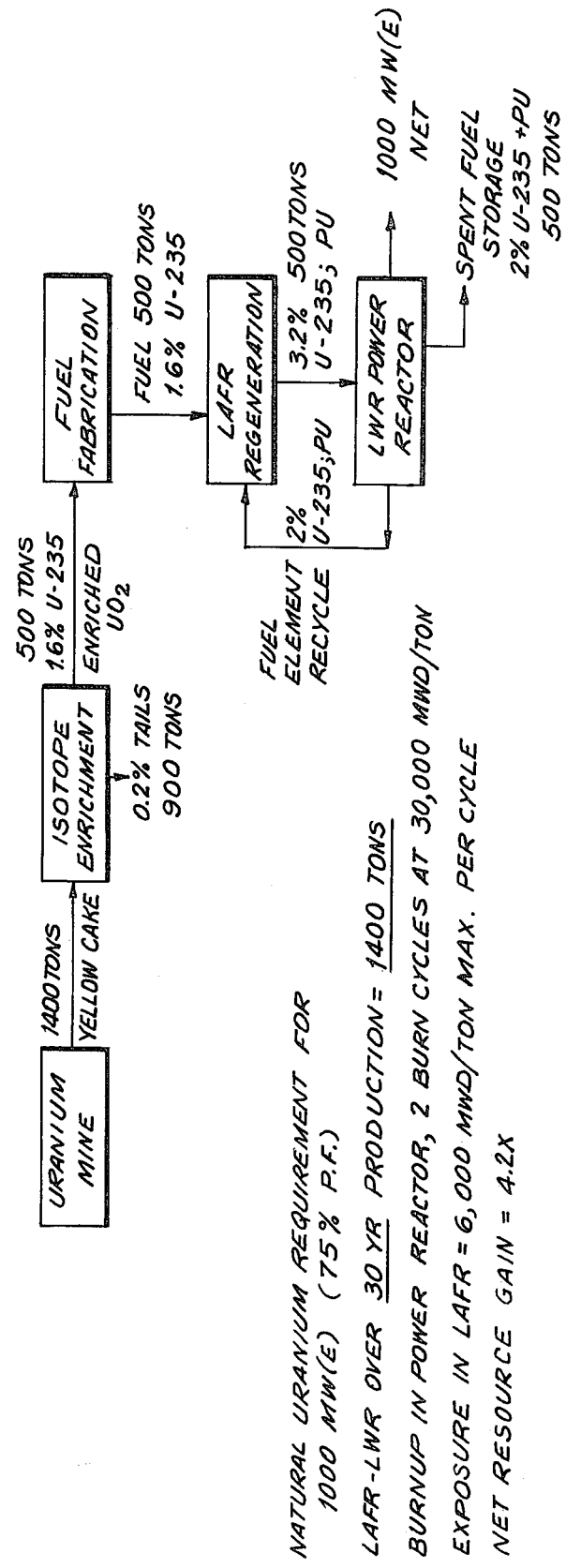
FIG. 9 is a flow chart illustrating the LAFER fuel cycle of the invention.

The proposed LAFER fuel cycle without reprocessing is shown in FIG. 9. The basis of this fuel cycle is (1) first to head-end enrich natural uranium to 1.6% U-235, (2) then to fabricate elements and generate fissile material in situ in the LAFER to an average of 2.8% for the initial core inventory, (3) burn the fuel in an LWR for 30,000 MWD/ton down to 2% fissile material, (4) return fuel and regenerate in the LAFER back to 3.2%, (5) further burn another 30,000 MWD/ton in the LWR, and (6) finally discard the 2% spent fuel after the second LWR burn cycle.

There are two reasons for head-end isotope enrichment: (1) it makes up inventory lost in the spent fuel, (2) it is more economical than building up initial core inventory from natural uranium in the LAFER and (3) it takes less time to build up LWR inventory (i.e., it would take 1 LAFER at least two years to build up inventory of 2.4 tons for 1 LWR core loading). With 1.6% enrichment, it takes less than 1 year to provide the LWR inventory. The cycle assumes a 300 MW beam LAFER producing 1200 Kg/yr (1.2 MT/yr) of fissile Pu-239.

TABLE III

FISSILE FUEL PRODUCTION CHARACTERISTICS FOR Pb—Bi/FUEL ELEMENT TARGET ASSEMBLIES
PROTON ACCELERATOR 300 MA-1 GeV

| DESIGN NUMBER | INITIAL NEUTRON YIELD $Y_N$ (INCLUDES FISSION REACTION) | INITIAL PRODUCTION RATE OF FUEL MATERIAL (TON/YR) | FERTILE MATERIAL | COOLANT | DENSITY OF COOLANT (G/CC) |
|---|---|---|---|---|---|
| 1 | 35.9 | Pu - 0.93 | $UO_2$ | $D_2O$ | 0.7 |
| 2 | 31.1 | $U^{233}$ - 0.81 | Th | $D_2O$ | 0.7 |
| 3 | 49.4 | Pu - 1.28 | $UO_2$ | $H_2O$ | 0.7 |
| 4 | 43.9 | Pu - 1.14 | $UO_2$ | $H_2O$ | 0.35 |
| 5 | 43.3 | Pu - 1.13 | $UO_2$ | $H_2O$ | 0.175 |
| 6 | 31.0 | $U^{233}$ - 0.81 | Th | $H_2O$ | 0.7 |
| 7 | 32.4 | $U^{233}$ - 0.84 | Th | $H_2O$ | 0.35 |
| 8 | 32.7 | $U^{233}$ - 0.85 | Th | $H_2O$ | 0.175 |

MODERATOR/FUEL VOLUME RATIO = 0.8

The initial yields for an accelerator producing 1 GeV protons of 300 ma current, vary from a low of 0.81 tons U-233/year for the Th-$UO_2$ system to 1.28 tons Pu-239/year for the $U_2O$-$H_2O$ system. Heavy water is a better coolant than light water because of the harder spectrum thus producing more fast fission neutrons. Furthermore, the thermal neutron yield for U-238 fission is higher than the Th-232, resulting in higher production rates for Pu-239. As fissile fuel builds into the system or when fuel containing fissile fuel is regenerated, the fissile yield in the highly undermoderated assembly should generate more fuel than when there is no fissile fuel content because of the multiplication of neutrons. For purposes of the systems and economic evaluation, an average production rate of 1.2 metric tons/yr (1200 Kg/yr) is assumed.

Two burn cycles for a total of 60,000 MWD/ton is possible with conventional zircaloy clad $UO_2$ fuel elements since burnup exceeding this value has been obtained in tests in existing water reactors. Zircaloy material damage saturates at 10,000 MWD/ton and further burnup does not alter the physical and chemical properties of zircaloy.

The 30-year lifetime natural U fuel requirement for this cycle is 1400 tons/day which is 4.5 times less than the 6300 tons/day presently required. This, therefore, yields a substantial improvement in utilization of the nuclear fuel resource. The calculation of fuel requirement is shown in Table IV below:

TABLE V

LINEAR ACCELERATOR FUEL ENRICHER REGENERATOR FOR LWR
ECONOMY 1 LAFER FEEDING 3 LWRS
NATURAL URANIUM RESOURCE GAIN
OVER PRESENT LWR ECONOMY
30 YR LIFETIME - 100 MW(E) PWR NEEDS - 6300 MT NAT $UO_2$

| NO. OF BURN CYCLES AT 30,000 MWD/MT EA. | TOTAL LWR BURNUP MWD/MT | 1 LAFER/3 LWR NAT $UO_2$ NEEDS* MT | NATURAL U RESOURCE GAIN LAFER-3 LWR/LWR |
|---|---|---|---|
| 1 | 30,000 | 2,800 | 2.3 |
| 2 | 60,000 | 1,400 | 4.5 |
| 3 | 90,000 | 933 | 6.8 |
| 4 | 120,000 | 700 | 9.0 |
| 5 | 150,000 | 560 | 11.3 |

*For 1.6% U-235 enrichment feed to LAFER.

TABLE IV

FUELING CYCLE FOR LAFER-LWR SYSTEM
1000 MW(E) LWR
REACTOR CORE LOADING = 100 MT
ANNUAL RELOAD = 33 MT

| END OF REACTOR YEAR | LOAD IDENTITY NUMBER IN LAFER | IN LWR |
|---|---|---|
| 0 | 1-2-3 | 0 |
| 1 | 4 | 1-2-3 |
| 2 | 3 | 4-1-2 |
| 3 | 2 | 3-4-1 |
| 4 | 1 | 2-3-4 |
| 5 | 4 | 1-2-3 |
| 6 | 3 | 4-1-2 |
| 7 | 2 | 3-4-1 |
| 8 | 5-6-7 | 2-3-4 |
| 9 | 8 | 5-6-7 |

Each load in LWR for 6 years at 10,000 MWD/MT = 60,000 MWD/MT
First cycle is 8 years - (on equil. cycle 6 years)
One LWR Core loading nat U
requirement = 2.8 × 100 = 280
+ inventory in LAFER = 33 × 2.8 = 92
Total = 372 MT
Total 30 yr nat U requirement = 30/8 × (372) = 1400 MT
Resource gain = 6300/1400 = 4.5 X
in 3 region core 3.2%-2.8%-2.4%→2.0% out
On equilibrium basis 30/6 × 280 = 1400 MT
Enr.factor (0.7 to 1.6%) = 2.8

A shuffling of fuel between the LWR and LAFER is necessary in three zones. The average initial feed enrichment is 2.8%. Only one example is given in Table IV but the LAFER actually supplies three LWR's. In the equilibrium mode, fuel goes into the conventional LWR at 3.2%, progresses through the three zones after three years at 10,000 MWD/ton/yr and comes out at 2% for regeneration. The initial 1.6% enriched fuel which precedes the LAFER actually provides inventory for the LWR every 6 years because of the total burnup of 60,000 MWD/ton. The maximum equivalent burnup stress due to the regenerator is 6,000 MWD/ton which is not more than 20% of the LWR burn cycles. This is a maximum burnup based on generating no more heat in the target than is necessary to provide power to the accelerator to make the system self-sufficient. It may, however, be more economical and less stressful not to generate that much power and to purchase outside power for running the accelerator.

A general calculation to indicate the effect of additional burn cycles is shown in Table V. Beyond 2 burn cycles the incremental gain in resource decreases, i.e., 2 burn cycles improves the resource 4.5 times and 5 burnup cycles increase it further by a factor of 2.5 to 11.3 times. Another point is that even at 1 cycle, the gain is a factor of 2.3 which is significant even without stressing the element beyond today's conventional burnup.

Figure 10:
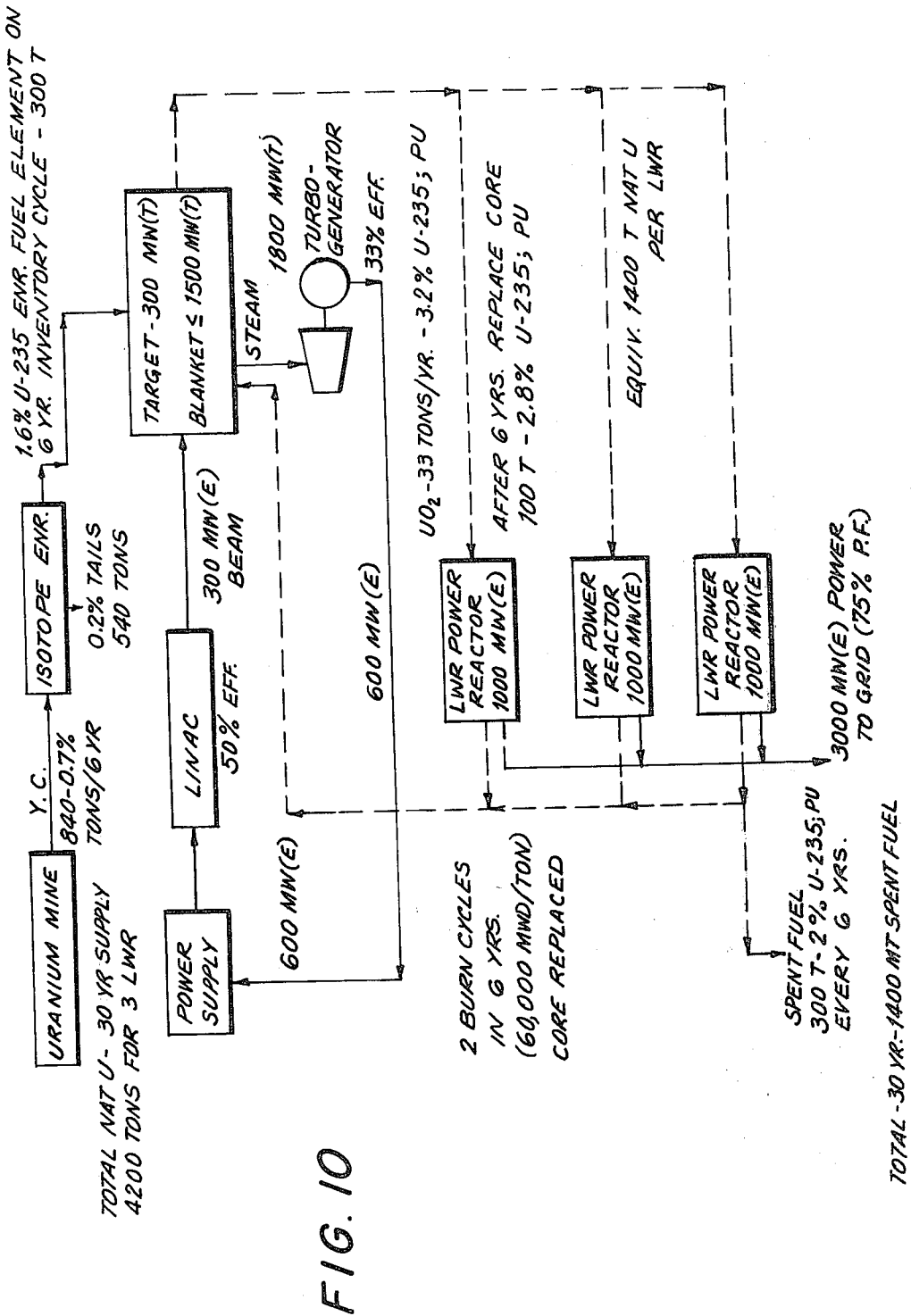
FIG. 10 is a flow diagram tracing through a U-Pu 239 fuel cycle for one LAFER supporting three LWRs.

FIG. 10 traces through the entire U-Pu-239 fuel cycle economy for 1 LAFER supporting 3 LWR's. In this case, there has been assumed a maximum thermal power generation in the target assembly of 1800 MW(t) (300 MW(t) direct beam deposition in the lead target and 1500 MW(t) in the surrounding blanket due to fast fission multiplication). This energy would be sufficient to generate 600 MW(e) at 33% power cycle efficiency to feed the accelerator power supply with a 50% power input to beam power output efficiency. The LAFER then becomes self-sufficient in power.

From what has been stated hereinabove, it will now appear that there is provided in accordance with the invention, a method of generating neutrons by distributing a liquid metal with varying spatial density along a path and guiding a beam of high energy particles along said path through said metal. The metal may be generated as a plurality of spaced falling jets and the method may furthermore comprise enriching fuel elements by arranging the same on opposite sides of said path to absorb the neutrons produced by the metal when impinged upon by said beam.

The invention will also incorporate recovering the heat which results from the enriching of the fuel elements when impinged upon the thusly generated neutrons. Furthermore, the method of the invention will, as noted hereinabove, comprise recycling the said fuel elements from and to a nuclear reactor. Moreover, the invention comprises enriching fuel elements before they are initially used in the associated nuclear reactor.

There will now be obvious to those skilled in the art many modifications and variations of the apparatus and method set forth hereinabove. These modifications and variations will not depart from the scope of the invention if defined by the following claims.

What is claimed is:

1. An apparatus comprising:
   (a) a source for supplying a beam of particles, said beam passing through a predetermined region; and,
   (b) a plurality of jets of liquid metal also passing through said region in a direction substantially transverse of said beam, said metal responding to said beam by isotropically emitting a multiplicity of spallation neutrons per particle striking said jets, and said jets being distributed through said region so that the absorption of energy from said beam by said jets and the emission of neutrons by said jets is substantially uniform through said region.

2. Apparatus as claimed in claim 1 wherein said particle source is a source of high energy protons.

3. Apparatus as claimed in claim 2 wherein said means includes a source of liquid lead which constitutes said liquid.

4. Apparatus as claimed in claim 3 wherein said lead is part of a lead-bismuth eutectic.

5. Apparatus as claimed in claim 2 further comprising a fertile blanket operatively associated with said liquid for the enhancing of said blanket.

6. Apparatus as claimed in claim 5 wherein said means includes a source of falling liquid metal jets spaced along and in intersecting relation with said beam, said jets being arranged to provide a liquid metal to space ratio of 10–50% of liquid metal within said region.

7. Apparatus as claimed in claim 6 wherein said blanket straddles said jets on opposite sides of said beam.

8. Apparatus as claimed in claim 6 comprising means to collect the falling jets and to recycle the thusly collected liquid metal.

9. Apparatus as claimed in claim 6 wherein said blanket includes vertically aligned fuel assemblies.

10. Apparatus as claimed in claim 6 wherein said blanket includes horizontally aligned fuel assemblies.

11. Apparatus as claimed in claim 6 wherein said blanket includes pressure tubes, containing fuel assemblies.

12. Apparatus as claimed in claim 6 comprising a vessel enclosing said blanket, a shroud opening into said vessel and adapted for guiding said beam from said source of protons to said vessel and at said jets, said blanket including pressure tubes on opposite sides of said jets, said vessel and shroud cooperatively defining a continuous chamber.

13. Apparatus as claimed in claim 12, wherein said pressure tubes define chambers isolated within said continuous chamber, and further comprising fuel element rods in said pressure tubes.

14. Apparatus as claimed in claim 13 wherein the particle source is a proton accelerator adapted to generate a beam of about one GeV and three hundred ma.

15. Apparatus as claimed in claim 13 wherein the pressure tubes define in said continuous chamber a slot aligned with said shroud and through which said jets pass from said source of falling liquid metal jets.

16. Apparatus as claimed in claim 15 wherein the source of falling liquid metal jets supplies liquid metal having vapor pressure of about $10^{-4}$ torr and at a temperature of about 300° C.

17. Apparatus as claimed in claim 15 wherein said slot had a width of about thirty-six cm.

18. Apparatus as claimed in claim 15 wherein the pressure tubes are of zircaloy.

19. Apparatus as claimed in claim 15 comprising means to supply a water-steam mixture to said pressure tubes.

20. Apparatus as claimed in claim 13, wherein said vessel includes an upper wall through which said pressure tubes open, a lower wall, and an intermediate wall through which said pressure tubes open, comprising removable plugs in said pressure tubes adjacent said upper wall, pipes extending through said lower wall into said pressure tubes, calandria tubes on said pipes within said pressure tubes, means for supplying a water-steam mixture between the lower and intermediate walls to pass into said pressure tubes, said mixture passing into said calandria tubes and out through said pipes.

21. Apparatus as claimed in claim 19 comprising means detachably located in said calandria tubes to support said fuel element rods therein.

22. Apparatus as claimed in claim 21 wherein said means and rods constitute a PWR fuel assembly in each said calandria tube and defining therein a passage for said water-steam mixture.

23. Apparatus as claimed in claim 13 comprising end shields supporting said pressure tubes adjacent the ends thereof.

24. Apparatus as claimed in claim 23 wherein the end shields each include a casing provided with openings for the pressure tubes and a multitude of balls in each said casing through which the pressure tubes are inserted.

25. Apparatus as claimed in claim 24 comprising means to supply a water-steam mixture through said pressure tubes.

26. A method for generating neutrons, comprising the steps of:
(a) providing a beam of particles, said beam passing through a predetermined region; and,
(b) further providing a plurality of jets of liquid metal also passing through said region in a direction substantially transverse to said beam, said metal responding to said beam by isotropically emitting a multiplicity of spallation neutrons per particle striking said jets, and said jets being distributed through said region so that the absorption of energy from said beam by said jets and the emission of neutrons by said jets is substantially uniform through said region.

27. A method as claimed in claim 26 wherein said metal is generated as a plurality of spaced falling jets providing a liquid metal to space ratio of ten to fifty percent of liquid metal.

28. A method as claimed in claim 27 comprising enriching fuel elements by arranging the same on opposite sides of said path to absorb the neutrons produced by the metal when impinged upon by said beam.

29. A method as claimed in claim 28 comprising recovering heat which results from the enriching of said fuel elements.

30. A method as claimed in claim 29 comprising recycling the said fuel elements from and to a nuclear reactor.

31. A method as claimed in claim 30 wherein the fuel elements are enriched before initially being used in said nuclear reactor.

32. An apparatus comprising:
(a) A first means for supplying a beam of high energy particles; and,
(b) a second means to supply a plurality of liquid metal jets in intersecting relation with said beam, said jets being arranged so that there is a liquid metal to space ratio of about 10–50% liquid metal within the region of said intersection, and said metal being lead or a lead-bismuth eutectic.

33. Apparatus as claimed in claim 32 wherein the ratio is such that there is about 20% liquid metal.

34. Apparatus as claimed in claim 32 wherein said second means supplies solid free falling jets in spaced relation.

35. Apparatus as claimed in claim 34 wherein the jets are spaced on centers at about 2–3 times the average diameters of the jets.

36. Apparatus as claimed in claim 35 wherein the average diameter is about 2 cm and the centers are spaced at about 4–6 cm.

37. Apparatus as claimed in claim 32 wherein the jets are arranged along a rectiliner path.

38. Apparatus as claimed in claim 32 wherein the jets are arranged along a path of about three meters length.

39. Apparatus as claimed in claim 32 wherein the jets are of circular cross-section.

40. Apparatus as claimed in claim 32 wherein the jets have an initial speed of about 5–10 ft./sec.

* * * * *